United States Patent Office 3,494,735
Patented Feb. 10, 1970

3,494,735
PHOSPHORIC ACID
Linden Wayne Cochran, Basking Ridge, N.J., assignor to Multi-Minerals Limited, a corporation of Canada
No Drawing. Filed July 31, 1964, Ser. No. 386,764
Int. Cl. C01b 25/18
U.S. Cl. 23—165          16 Claims

ABSTRACT OF THE DISCLOSURE

The present invention is directed to a process for the manufacture of phosphoric acid in which a phosphate salt is treated with phosphoric acid to form a mother liquor containing dissolved phosphate salts. The dissolved phosphate salts are crystallized and the crystallized salts are contacted with a cationic ion exchange resin to form phosphoric acid.

---

The present application relates to phosphoric acid and and more particularly to a method of producing the same.

Conventional processes for the production of phosphoric acid generally use tricalcium fluorophosphate, commonly known as apatite, as the starting material. Apatite, in its broadest sense, has the formula $Ca_5(F \cdot Cl)(PO_4)_3$. Its commercial designation is phosphate rock which has the chemical formula $[Ca_3(PO_4)_2]_3 \cdot CaF_2$. Chemical and food grade phosphoric acid, $H_3PO_4$, is conventionally produced by smelting apatite to produce elemental phosphorus, oxidizing the phosphorus to phosphorus pentoxide, and dissolving the phosphorus pentoxide in water to produce phosphoric acid. In addition, calcium phosphate may also be used as the starting material. These reactions may be expressed by the following equations:

(1) $[Ca_3(PO_4)_2]_3 \cdot CaF_2 + 10SiO_2 + 14C \rightarrow$
$$6P + 4CO + 10CaSiO_3 + CaF_2$$
(2) $2P + 5CO + 5O_2 \rightarrow P_2O_5 + 5CO_2$
(3) $P_2O_5 + 3H_2O \rightarrow 2H_3PO_4$ Phosphoric acid has been produced by several wet-process systems. The most common wet-process system is the Dorr-Oliver Strong Acid Process. The apatite or phosphate rock is reacted with sulphuric acid to produce phosphoric acid and calcium sulfate according to the following reaction:

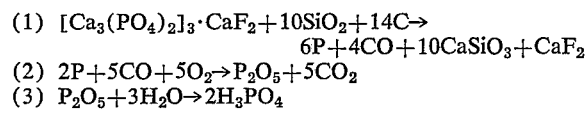

$[Ca_3(PO_4)_2]_3 \cdot CaF_2 + 10H_2SO_4 + 20H_2O$
$$\rightarrow 6H_3PO_4 + 10(CaSO_4 \cdot 2H_2O) + 2HF\uparrow$$

The process has the advantage of lower initial investment over the elemental phosphorus route, the ability to cope with lower grade feed stock and lower operating costs. The phosphoric acid produced is of lower quality than furnace grade acid. The sulphuric acid tends to solubilize all of the apatite, including the non-phosphate elements. Other than the $CaSO_4$, which by virtue of its insolubility in $H_3PO_4$ precipitates and a part of the $H_2F_2$ which volatilizes, the remaining dissolved elements remain in the acid as impurities. This presents no problem so long as the acid is to be utilized solely for agricultural purposes. However, efforts to improve the grade and quality of this wet-process acid have encountered serious difficulties and have met with only limited success.

Three additional wet-process systems to form phosphoric acid have been introduced in recent years, i.e., the hydrochloric acid system introduced by Israeli Mining Industries Ltd., the hydrochloric acid system introduced by Dow Chemical Company and the Nitric Acid System announced by St. Paul Ammonia Company.

The Israeli process utilizes hydrochloric acid as the leach to solubilize the apatite with the production of calcium chloride as the principal by-product according to the reaction:

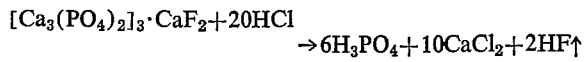

$[Ca_3(PO_4)_2]_3 \cdot CaF_2 + 20HCl$
$$\rightarrow 6H_3PO_4 + 10CaCl_2 + 2HF\uparrow$$

The resulting solution is then stripped of the phosphoric acid by liquid-liquid extraction techniques utilizing a straght chain alcohol as solvent for the acid fraction. The residual liquor is rich in calcium chloride and other hydrogen chloride soluble elements which can be evaporated to a solid and sold for its by-product value. The acid-laden solvent is then further treated to remove the phosphoric acid and the solvent recycled for further use.

In the Dow system (United States Patent No. 3,072,-461, issued Jan. 8, 1963) hydrochloric acid is also used as the leachant, following which the phosphoric acid is separated from the other solubilized material by liquid-liquid extraction techniques utilizing an alkyl substituted phosphate as solvent. (The chemistry of the initial reaction is identical wth that of the Israeli Process above.) Following the acid stripping step, the phosphate natant solution is separated by fractional distillation into phosphoric acid and the alkyl substituted phosphate solvent. The acid so produced contains residual hydrochloric acid which must be separated from the phosphoric acid.

The St. Paul wet-process system utilizes nitric acid as the solvent (Canadian Patent No. 672,008, issued Oct. 8, 1963). The principal by-product is calcium nitrate which has value as a fertilizer ingredient. The chemistry is essentially as follows:

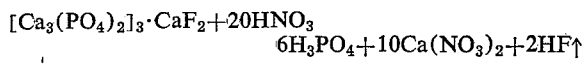

$[Ca_3(PO_4)_2]_3 \cdot CaF_2 + 20HNO_3$
$$6H_3PO_4 + 10Ca(NO_3)_2 + 2HF\uparrow$$

The resultant phosphoric acid is subject to a prior treatment while still in solution with the calcium nitrate and is then extracted by liquid-liquid extraction techniques. The calcium nitrate can be sold as such, converted to ammonium nitrate or converted to calcium carbonate and nitric acid, the former to be sold and the latter recycled to the apatite leaching stage.

These processes all have one thing in common; the use of an acid leaching material which at the outset introduces impurities into the system which must eventually be removed at an extra cost to the operator. Secondly, the acid produced by the wet-process systems is inherently-contaminated by tramp ions because of the strong dissolving capabilities of the leach acid employed. These tramp contaminants can only be removed with great difficulty or not at all. Thus, the product yielded is not capable of attaining the highest purity classifications. The hydrochloric acid and nitric acid systems are of less widespread applicability since they are dependent, at least in part, upon by-product acid available at a relatively low cost. This reduces the spatial limits in which these two latter systems can be utilized.

The present invention eliminates these drawbacks and provides for a new and improved method for the production of phosphoric acid.

Another object is to produce highly purified phosphoric acid.

Still another object is to provide an economical method for the production of highly purified phosphoric acid.

A further object is to provide a process which is adapted for either batch or continuous operation.

Another object of the present invention is the provision of an improved method of producing phosphoric acid in which no foreign material is introduced which must later be removed.

A still further object of the present invention is the provision of an improved method of making phosphoric acid which does not depend upon by-product acids.

Other and further objects of the invention will be obvious upon an understanding of the illustrative embodiment about to be described, or will be indicated in the appended claims, and various advantages not referred to herein will occur to one skilled in the art upon employment of the invention in practice.

Basically, the process of the present invention consists of an acid leach of apatite to produce an intermediate product which in turn is reacted in a novel acid medium to produce highly purified phosphoric acid. According to the present process, tricalcium fluorophosphate (apatite) is leached with phosphoric acid to produce monocalcium orthophosphate. Hydrogen fluoride is liberated from the apatite during the leaching and is removed from the acidic solution by continuous sparging with air. Other sparging materials, such as an inert gas, may also be used, if desired. Furthermore, a negative pressure could be affixed in the reaction chamber to implement "boiling" to agitate the mother liquor and draw off the hydrogen fluoride. The reaction is accelerated by heating (to between 90° and 105° C.) and agitation. The chemical reaction occurring in this leaching is as follows:

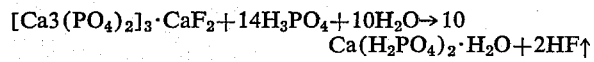

The quantity of acid employed in this step is an amount in excess of the stoichiometric quantity required for the reaction. It has been found that the quantity of excess acid used be about six times the stoichiometric ratio to obtain the desired result. It has also been found that an acid concentration of about 50% $H_3PO_4$ (weight by weight) will produce the desired results. Monocalcium orthophosphate, which results from the foregoing reaction, is soluble in acidic solutions. By virtue of this solubility, the insoluble residues (gangue) normally associated with apatite may be readily removed, e.g., by filtration, gravity settling and decantation, etc., the acid soluble monocalcium orthophosphate being present in the filtrate.

The filtrate is then cooled, preferably to a temperature between 70° and 85° C., sufficiently to permit a portion of the monocalcium orthophosphate to crystallize. The crystallized monocalcium orthophosphate is then removed from the solution, e.g., by filtration. The separated crystals are then washed with an aqueous or acidic saturated solution of monocalcium orthophosphate to remove entrained phosphoric acid and/or contaminating ions.

The washed, crystallized monocalcium orthophosphate is solubilized, either with hot water at a temperature close to the temperature of the crystals, or in phosphoric acid, and contacted by a strongly acidic cationic ion-exchange resin. The calcium ions and any other cation that may be present, such as $Fe^{+++}$, $Al^{+++}$ or molecules of compounds acting as cations, e.g., $AlF_2^+$, are selectively removed by the action of the ion-exchange resin. The hydrogen ions simultaneously released by the resin provide the necessary additional hydrogen ion required to produce orthophosphoric acid, according to the following equation:

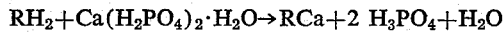

Any vagrant cations, e.g., Fe, Al or Si, which may not have been removed by the aqueous or acidic rinse will also be acquired by the ion-exchange resin.

The calcium saturated ion-exchange resin may be regenerated by mineral acids, such as sulfuric acid or hydrochloric acid. The choice of regenerant will be determined by the relative cost of the acid and the relative value of the regeneration product, e.g., calcium sulfate or calcium chloride.

Instead of first dissolving the monocalcium orthophosphate in either water or acid medium prior to contacting with a strongly acidic cationic ion-exchange resin, the dry crystalline material may be contacted directly with wet cationic resin. With heat and agitation, the sulfonic acid medium inherent in the cationic resin will solubilize the crystalline material with subsequent evolution of phosphoric acid and saturation of the resin by calcium ions. The end result obtained in this manner is the same as in the procedure given above, that is, by first solubilizing the crystallized monocalcium orthophosphate and then contacting the solute with a strongly acid cationic ion-exchange resin. Examples of suitable strongly acidic cationic ion-exchange resins are those of the phenolic methylene sulfonic type, the nuclear sulfonic type or the sulfonated coal type. Such exchange resins are described in United States Patents No. 2,191,853, No. 2,366,007 and No. 2,518,420. Ion-exchange resins sold under various designations, such as Duolite C–20, Amberlite IR–100, Amberlite IR–105, Amberlite IR–120, Wolfatit P, Wolfatit K and Zeo Karb are mentioned as specific examples of useful commercially available ion-exchange resins.

The following examples illustrate the present invention without, however, limiting the same thereto.

I. Preparation of $Ca(H_2PO_4)_2 \cdot H_2O$, monocalcium orthophosphate, from apatite by acid leach and crystallization. The basic chemical reaction involved is:

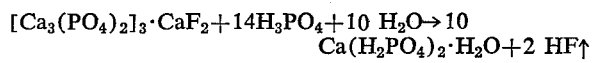

EXAMPLE 1

An acid leaching solution consisting of 96.0 gm. of 85.6% $H_3PO_4$ and 53.5 gm. of $H_2O$ were heated to 90° C. in an open vessel. To the hot leaching medium were added 10 gm. of apatite which had been preheated to 90° C. The tricalcium phosphate had the following analysis:

Percent: $P_2O_5$, 39.60; CaO, 50.80; F. 2.72; HCl soluble Fe 1.75; S, 0.57; $SiO_2$ 4.34; $Al_2O_3$ 0.08; MgO 0.18.

The reaction was continued for 30 minutes at temperatures ranging from 90° C.–100 C. The resulting liquor was filtered through a hot Buchner funnel to remove insolubles. Upon cooling, $Ca(H_2PO_4)_2 \cdot H_2O$ crystallized from the filtrate. The crystalline produce was separated by filtration, dried and weighed. The yield was 13.4 gm., the insolubles weighed 0.52 gm.

EXAMPLE 2

The procedure outlined in Example 1 was extended to simulate a continuous operation as follows: 1495 gm. of 55% $H_3PO_4$ were heated to 90 C. in an open reaction vessel provided with a mechanical agitator and air sparger. 100 gm. of apatite which had also been preheated to 90° C. were added. (The apatite had the same analysis as in Example 1.) The reaction was continued for 30 minutes with continuous agitation and air sparging. The resulting liquor was hot-filtered to remove insoluble gangue and then permitted to cool. Upon cooling, monocalcium orthophosphate crystallized from the solution and was filtered off. The crystals were dried and weighed and the mother liquor prepared for the next cycle. The yield of monocalcium orthophosphate was 157.6 gm.; the insolubles weighed 4.9 gm.

To the reserved mother liquor there were added 160 gm. of 85.6% $H_3PO_4$ and 89.2 gm. $H_2O$ to replenish the hydrogen ion and $H_2O$ removed by the 157.6 gm. of $Ca(H_2PO_4)_2 \cdot H_2O$ obtained as indicated above. The replenished mother liquor was heated to 90° C. and 100 gm. of apatite which had been preheated to 90° C. were added. The reaction time and temperature were the same as in the first cycle. The yield of monocalcium orthophosphate was 235.1 gm.; the insolubles weighed 5.8 gm.

To the reserved mother liquor there were added 200 gm. $H_2O$, 160 gm. of 85.6% $H_3PO_4$ and 100 gm. of apatite which had been preheated to 90° C. The reaction was continued as in the previous cycles. The yield of monocalcium orthophosphate was 147.7 gm.; the insolubles weighed 19.7 gm.

Total weight of apatite utilized _____ gm__ 300.0
Total weight of monocalcium orthophosphate recovered _____ gm__ 540.4
Total weight of insolubles _____ gm__ 30.4
Theoretical yield of monocalcium orthophosphate gm__ 753
Actual recovery _____ percent__ 71.5

Complete removal of monocalcium orthophosphate from the mother liquor was not an objective, as the resulting total impoverishment of the mother liquor would have the effect of reducing the process to a batch rather than a continuous operation.

EXAMPLE 3

The procedure utilized was a variant of Example 2 in that an aliquot of mother liquor was removed and treated to precipitate the monocalcium orthophosphate, appropriate amounts of leaching agent and apatite being used to replenish the mother liquor in proportions equivalent to that removed by the monocalcium orthophosphate.

Cycle 1

7440 ml. of 55% $H_3PO_4$ were heated to 85° C. in a closed vessel equipped with agitator, air sparger and vapor collector in series with a condenser-vacuum system to collect the moisture evaporated from the mother liquor. 1 kg. of apatite (identical with the material used in Example 1) was added to the mother liquor and the reaction continued for 40 minutes while the temperature was maintained between 85° C. and 92° C.

At the end of the reaction period, 1860 ml. of the solution were withdrawn, filtered to remove any insolubles and cooled to precipitate the monocalcium orthophosphate. The gangue was rinsed with 55% $H_3PO_4$ to remove any entrained monocalcium orthophosphate. The precipitated crystalline monocalcium orthophosphate was rinsed with a saturated $H_2O$ solution of monocalcium orthophosphate to remove entrained $Fe^{+++}$, $Al^{++}$, $Ca^{+++}$, $Al_2F^+$, $AlF^{++}$ or $PO_4^{\equiv}$ ions. The rinse acid and water were utilized to replenish the mother liquor's deficiency in hydrogen ion ($PO_4^{\equiv}$) and $H_2O$ resulting from the removal of the monocalcium orthophosphate. The yield of monocalcium orthophosphate was 395.4 gm.

Replenish items:
Impoverished mother liquor _____ ml__ 1300
Wasch acid (55% $H_3PO_4$) _____ ml__ 300
Rinse water _____ ml__ 81.2
Apatite _____ gm__ 201.0

Cycle 2

The operating conditions of cycle 1 were duplicated with respect to time, temperature and reaction conditions.

An aliquot of 1873 ml. was withdrawn, filtered to remove gangue and cooled to precipitate the monocalcium orthophosphate. The yield of monocalcium orthophosphate was 311.5 gm.

To restore the mother liquor to its original condition, the following materials were utilized:

Impoverished mother liquor _____ ml__ 1190
Wash acid _____ ml__ 271
Apatite _____ gm__ 180 and the reaction was continued into a third cycle, similar to cycles 1 and 2.

II. Production of $H_3PO_4$ through reaction of ion-exchange resins with monocalcium orthophosphate. The reaction is typified by the following equation:

$$Ca(H_2PO_4)_2 \cdot H_2O + RH_2 \rightarrow 2H_3PO_4 + RCa + H_2O$$

where $RH_2$ is any cationic ion-exchange resin.

The monocalcium orthophosphate may be solubilized either in water or in phosphoric acid. It can also be solubilized by direct contact with any ion-exchange resin where the reaction yields acid directly plus water as a diluent.

EXAMPLE 4

Twelve gm. of $Ca(H_2PO_4)_2 \cdot H_2O$ produced in accordance with the previous examples were stirred in an open beaker with 100 ml. of Duolite C-20 cationic ion-exchange resin. The resin had previously been conditioned in accordance with the manufacturer's instructions. The reaction was continued for a period of 30 minutes. Analysis of the filtrate indicated the presence of 6.7 gm. of $H_3PO_4$ in the filtrate, or a yield of approximately 71.5% of the theoretical yield.

EXAMPLE 5

70 grams of $Ca(H_2PO_4)_2 \cdot H_2O$ plus 55 milliliters of water were added to 240 milliliters of Duolite C-20 cationic ion-exchange resin. The mixture was heated to 35° C. and remained in contact with agitation for 30 minutes at which time the resin and liquor were separated by filtration. A yield of 114 milliliters of acid, specific gravity 1.192 (approximately 32% $H_3PO_4$) was recovered.

EXAMPLE 6

In 58 milliliters of 30% $H_3PO_4$ were dissolved in 14 grams of $Ca(H_2PO_4)_2 \cdot H_2O$. The resulting solution was then contacted with 58 milliliters of Duolite C-20 cationic ion-exchange resin and agitated for 30 minutes at room temperature. The resin was separated from the acidic solution by filtration and the resulting liquor tested for specific gravity. It was determined that the specific gravity was 1.202, equivalent to 33% $H_3PO_4$.

EXAMPLE 7

The procedure in Example 6 was repeated, using 45% $H_3PO_4$ as solvent. The resultant acid produced had a specific gravity of 1.318, equivalent to an acid strength of 48.0% $H_3PO_4$.

As many and varied modifications of the subject matter of this invention will become apparent to those skilled in the art from the detailed description given herein, it should be understood that this invention is to be limited only in accordance with the appended claims.

What is claimed is:
1. The process for the manufacture of phosphoric acid comprising digesting a phosphate-containing material with phosphoric acid to form a mother liquor containing monocalcium orthophosphate, crystallizing said monocalcium orthophosphate, removing said monocalcium orthophosphate crystals from said mother liquor and contacting said monocalcium orthophosphate crystals with a cationic ion exchange resin to convert the monocalcium orthophosphate to phosphoric acid.
2. The process as claimed in claim 1, wherein insoluble materials are removed from the mother liquor.
3. The process as claimed in claim 1, wherein said monocalcium orthophosphate is crystallized by lowering the temperature of the mother liquor.
4. The process as claimed in claim 1, wherein said phosphate-containing material is apatite.
5. The process as claimed in claim 1, wherein the digesting phosphoric acid has a concentration of at least 50% phosphoric acid.
6. The process as claimed in claim 1, wherein said digestion occurs at temperatures above about 90° C.
7. The process as claimed in claim 1, wherein said crystals are washed in an aqueous saturated solution of monocalcium orthophosphate.
8. The process as claimed in claim 1, wherein said crystals are washed in an acidic saturated solution of monocalcium orthophosphate.
9. The process as claimed in claim 1, wherein said monocalcium orthophosphate crystals are solubilized before being contacted with said resin.

10. The process as claimed in claim 9, wherein said monocalcium orthophosphate crystals are solubilized in phosphoric acid.

11. The process as claimed in claim 9, wherein the monocalcium orthophosphate crystals are solubilized in hot water.

12. The process as claimed in claim 1, wherein the quantity of phosphoric acid employed to digest said phosphate-containing material is substantially in excess of the stoichiometric quantity required for the reaction.

13. The process as claimed in claim 1, wherein said digestion occurs at temperature of between 90° to 105 C.

14. The process as claimed in claim 1, wherein said monocalcium orthophosphate is crystallized by cooling the mother liquor to temperatures between 70° and 85° C.

15. The process for the manufacture of phosphoric acid comprising digesting phosphate-containing material with phosphoric acid having a strength of at least 50% phosphoric acid at temperatures between 90° and 105° C. in order to convert the phosphoric acid to monocalcium orthophosphate, the amount of phosphoric acid used to digest said rock being substantially in excess of the stoichiometric quantities required for the reaction in order to form a mother liquor containing said monocalcium orthophosphate, reducing the temperature of said mother liquor to between 70° to 85° C. in order to crystallize said monocalcium orthophosphate, separating said crystals from said mother liquor, washing said crystals in a saturated solution of monocalcium orthophosphate and contacting said washed crystals with a cationic ion exchange resin in order to convert the monocalcium orthophosphate to phosphoric acid.

16. The process as claimed in claim 15 wherein insoluble materials are removed from the mother liquor.

References Cited

UNITED STATES PATENTS

| | | | |
|---|---|---|---|
| 3,374,055 | 3/1968 | Villalou | 23—165 |
| 2,567,227 | 9/1951 | Miller | 23—109 |
| 2,914,380 | 11/1959 | Vickery | 23—109 |
| 3,044,851 | 7/1962 | Young | 23—165 X |

OTHER REFERENCES

Perry, Chem. Engrs. Handbook, 3rd edit. (1950) pp. 887 and 1052.

OSCAR R. VERTIZ, Primary Examiner

ARTHUR GREIF, Assistant Examiner

U.S. Cl. X.R.

23—109

UNITED STATES PATENT OFFICE
CERTIFICATE OF CORRECTION

Patent No. 3,494,735                                      February 10, 1970

Linden Wayne Cochran

It is certified that error appears in the above identified patent and that said Letters Patent are hereby corrected as shown below:

Column 1, line 58, "$H_2F_2$" should read -- $2HF$ --. Column 2, line 47, "inherently-contaminated" should read -- inherently contaminated --. Column 3, line 24, "$[Ca3(PO_4)_2]_3 \cdot CaF_2$" should read -- $[Ca_3(PO_4)_2]_3 \cdot CaF_2$ --. Column 4, line 38, "90° C-100 C." should read -- 90° C. - 100° C. --. Column 5, line 39, "$Al^{++}$" should read -- $Al^{+++}$ --; line 42, "hydrogen ion ($PO_4^=$) and $H_2O$" should read -- hydrogen ion, $PO_4^=$ and $H_2O$ --; line 47, "Wasch acid" should read -- Wash acid --.

Signed and sealed this 10th day of November 1970.

(SEAL)
Attest:

EDWARD M. FLETCHER, JR.
Attesting Officer
                                           WILLIAM E. SCHUYLER, JR.
                                           Commissioner of Patents